INVENTOR
ARNOLD F. SCHMECKENBECHER
BY George O. Saile
ATTORNEY

United States Patent Office 3,272,727

Patented Sept. 13, 1966

3,272,727

PROCESS FOR ELECTROPLATING MAGNETIC ALLOY ONTO A PLATINIZED CHROMIUM SUBSTRATE

Arnold F. Schmeckenbecher, Poughkeepsie, N.Y., assignor to International Business Machines Corporation, New York, N.Y., a corporation of New York Filed Aug. 23, 1962, Ser. No. 218,875
5 Claims. (Cl. 204—29)

The present invention relates to thin metallic films, and more particularly, to a process for improving the magnetic properties of electroplated thin ferromagnetic films by pretreating the substrate prior to electroplating.

The increasing demand for faster and more reliable computers has directed present day interests to solid-state electronic components. Thin magnetic film devices for use as storage elements in digital computers have been under intensive study. The motivation for this study of thin magnetic films has been the desire to improve the speed-to-power relation of present day memories utilizing ferrite cores. The speed of the memories has so far been limited by the speed with which the magnetization can be reversed between the two stable states representing the information 1 and 0.

A good basis for comparing thin magnetic bistable film devices to be used in computer memories and logic circuits is through the comparison of the "S-curves" of the respective devices. The "S-curve" of a thin magnetic film is the positive branch of the hysteresis "B-H" loop of the material. The lower the magnetic field required to cause the thin magnetic bistable film to reach its maximum magnetic flux value, the faster is the magnetic switching of the film and the lower the drive current required.

It is thus an object of this invention to provide magnetic films which are capable of magnetically switching at higher speeds when using lower drive currents than present day metallic films.

It is another object of the present invention to provide a process for the fabrication of thin magnetic films by electroplating techniques which may be produced in large quantities having high reliability.

Further, it is an object of this invention to provide a pretreatment process to be used preceding electroplating that will substantially increase magnetic switching at lower drive currents.

These and other objects are accomplished in accordance with the broad aspects of the present invention by utilizing a novel pretreatment and subsequent electroplating procedure. The metallic substrate to be electroplated is dipped into a solution containing hexachloroplatinic acid. The concentration of the solution may vary from 0.001 to 10% by weight of the hexachloroplatinic acid ($H_2PtCl_6 \cdot 6H_2O$). The substrate is rinsed in distilled water and dried. The substrate is then placed in an electrolytic bath which contains the salt or salts of the ferromagnetic metal or metals to be plated. The pretreated surface of the substrate is made the cathode of the cell and a suitable anode is positioned in the cell. Provision is made to orient the electrodeposit as deposited in a uniaxial direction. Electroplating is then accomplished according to the usual technique of passing a current between the cathode and the anode for the desired time. The electrodeposited thin films that have been formed on pretreated substrates possess high speed switching properties that are not obtainable when the electrodeposit is formed on an unpretreated substrate.

The foregoing and other objects, features and advantages of the invention will be apparent from the following more particular description of the preferred embodiments of the invention, as illustrated in the accompanying drawings.

Figures 1, 2:
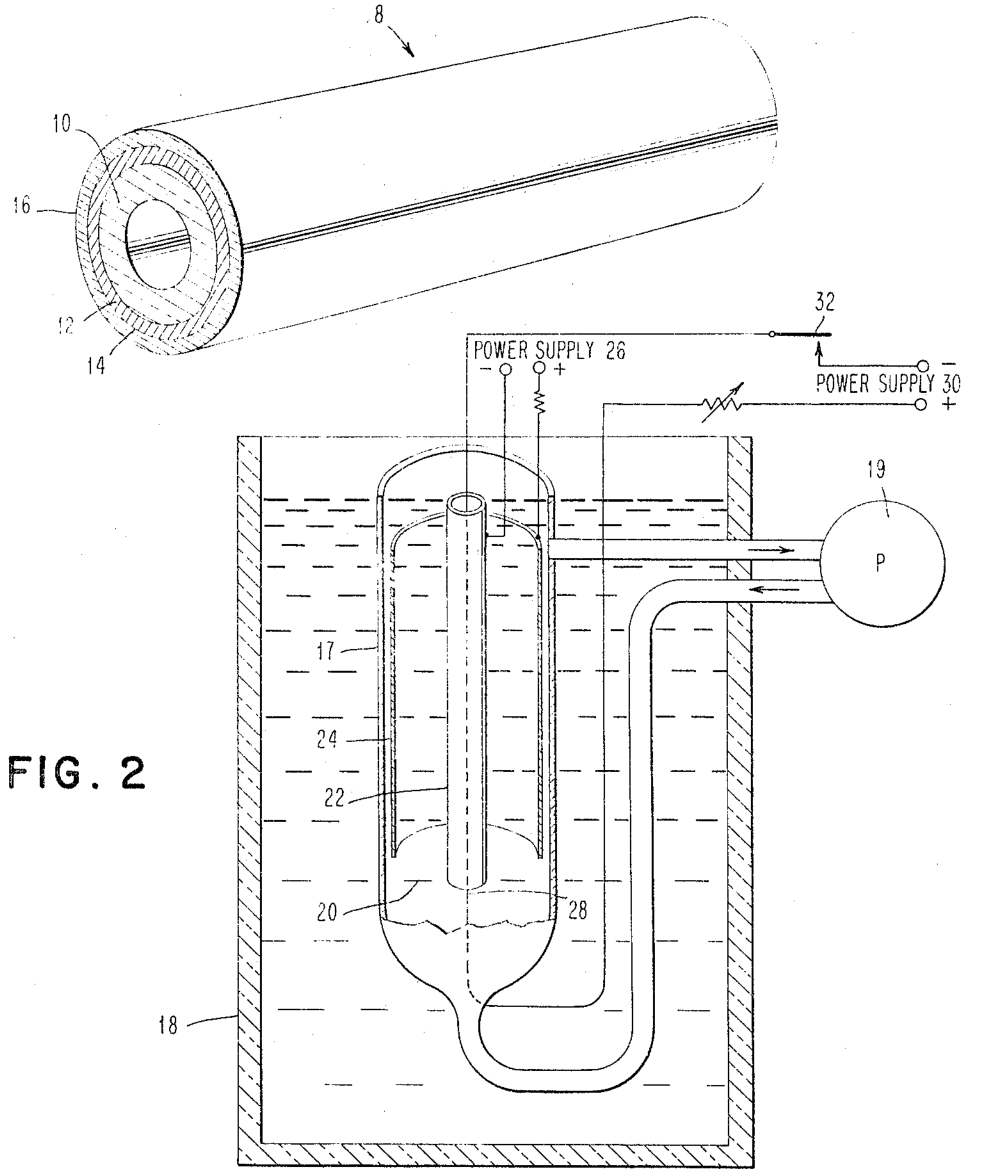
FIGURE 1 is a perspective sectional view of a bistable magnetic thin film made by the present invention.
FIGURE 2 is a diagrammatic view of one possible electroplating set up useful in practicing the present invention.

Referring now more particularly to FIGURE 1, there is shown a bistable magnetic core made by the present invention. The magnetic core 8 is composed of a cylindrical siliceous substrate 10 preferably of glass, a conductive chromium metallic layer 12, a layer 14 of an extremely thin film of platinum, and an electroplated ferromagnetic substantially circumferentially oriented alloy layer 16. The substrate is of very small diameter. Inside diameter (I.D.) to outside diameter (O.D.) sizes of 0.20 inch–0.030 inch and 0.025 inch–0.030 inch have been used and even smaller diameters are possible. The height of the magnetic thin film element is very small and is preferably 100 mils or less.

The conductive chromium layer may be deposited onto the siliceous substrate by any conventional means. Vacuum evaporation, however, is the preferred procedure. The siliceous material substrate is thoroughly cleaned, dried and then placed in a vacuum evaporation chamber. A coating of chromium having a thickness of approximately 100 to 1000 Angstrom units is condensed upon the surface of the siliceous substrate.

The chromium substrate layer is then dipped into a solution of hexachloroplatinic acid having a concentration of 0.001 to 10% by weight. The dipping may be carried out at room temperature or at an elevated temperature up to 100° C. without agitation or in a bath agitated ultrasonically, for a time ranging from a few seconds to thirty minutes or more.

The conductive chromium layer is now prepared for electroplating. FIGURE 2 shows schematically one possible electrical set up for electroplating the ferromagnetic thin film on the pretreated chromium conductive substrate. An electrolytic cell container 17 is positioned within a constant temperature bath 18. The container 17 has a liquid outlet near its top and an inlet at its base. The container 17 is filled with an electrolyte 20 which is circulated constantly by means of a circulating pump 19 of any conventional design. The electrolyte 20 includes at least one salt of the ferromagnetic metal to be plated in solution. The substrate having the conductive chromium layer thereover has its ends closed with silver metal and then introduced into the electrolyte. The conductive layer is made cathode 22 of the electrolytic cell. A suitable anode 24 made of platinum or nickel is introduced as the anode of the cell. The anode and the cathode are connected respectively to the plus and minus terminals of a first power supply 26. Means are provided to apply a circumferential orienting field during the electroplating around the cylindrical conductive substrate 22. One such means, as shown in FIGURE 2, is an electrical conductor 28 that passes through the center of the cylinder and is connected to a second power supply 30. A switch 32 is provided for turning the orienting current on and off.

The electrolytic bath may be one of various known compositions. The principal types for electrodepositing ferromagnetic material in the art are the sulfate, sulfamate, chloride and a combination of sulfate and chloride baths. The names of the electrolytic baths are taken from the name of the metal salt used to provide the required ferromagnetic ions to the bath.

The preferred bath, however, is the aqueous chloride bath wherein the ferromagnetic ions, such as $Ni^{++}$ and $Fe^{++}$, are brought into solution by means of nickel and iron chlorides. The other constituents of the bath include a buffer, an inorganic chloride, a wetting agent and a stress reducing material. Boric acid is the preferred buffer. The inorganic chloride, which may be, for example, a sodium or potassium chloride, favors dissolving of the anode in the case of soluble anodes and increases the conductivity of the bath. An example of the wetting agent is sodium lauryl sulfate and is used to decrease the adhesion of the hydrogen bubbles on the cathode surface. The stress reducing agent is preferably saccharin. Saccharin reduces the stresses in the electrodeposit by a large percentage.

The bath composition and the electrolyzing current density have substantial influences upon the iron content of the ferromagnetic deposit. Where the ferromagnetic deposit is to be a nickel-iron alloy, as an example, the iron content in the electrodeposit would increase where either the current density or the bath concentration of the $Fe^{++}$ is increased. The adjustment of the current density, however, is the preferred method of varying the alloy composition.

Electroplating is initiated by passing a current between the cathode 22 and the anode 24. Preferably, the circumferential orienting field is applied during only 60 and 95% of the electroplating period. The orienting field is left off preferably during the first portion of the electroplating.

Following the electroplating procedure, the plated article may be subjected to various tests to insure operativeness and uniformity between electroplated articles. The acceptable electroplated articles can then be used as such or sliced into smaller pieces or individual magnetic cores by a suitable cutting tool.

The following are examples of the present invention in detail. The examples are included merely to aid in the understanding of the invention and variations may be made by one skilled in the art without departing from the spirit and scope of this invention.

*Example 1*

A 0.030 inch outside diameter-0.020 inch inside diameter glass tube, 3 inches long was thoroughly cleaned and dried. The tube was inserted into a standard vacuum evaporation chamber and coated on its external surface with a layer of chromium having a resistance of 4.14 ohms per square.

The cylindrical glass substrate with its conductive layer of chromium on its external surface had its ends silvered closed and was placed in the electrolytic cell set up of FIGURE 2 and made the cathode of the cell by the connection to the conductive layer. The electrolyte in the cell consisted of the following constituents in an aqueous solution:

| | G./l |
|---|---|
| Nickel chloride ($NiCl_2 \cdot 6H_2O$) | 194 |
| Ferrous chloride ($FeCl_2 \cdot 4H_2O$) | 8 |
| Sodium chloride (NaCl) | 9.7 |
| Boric acid ($H_3BO_3$) | 25 |
| Saccharin | 1 |
| Sodium lauryl sulfate | 0.42 |

An electrical conductor was strung through the cylindrical substrates as shown in FIGURE 2. The orienting field current was 2.5 amperes. The electrolyte temperature was maintained at 33.1±0.1° C. by use of a standard constant temperature bath, containing heating and cooling means, surrounding the plating bath in conjunction with a thermostat in the cell. The pH was maintained at 3.45±.02. The electrolyte was constantly circulated through the cylindrical anode by means of a circulating pump. For the first 2.05 minutes of the electroplating, the orienting current was turned off. The orienting current was on during the remaining electroplating period. A current density of 5.9 milliamps was maintained for an electroplating period of 13.6 minutes and a resulting electrodeposit of approximately 8,000 Angstrom units with a composition of approximately 80% nickel and 20% iron was deposited.

A "500 nanosecond S-curve" for the thin film obtained in this example was plotted by initially exposing the material to a high magnetic field in one direction as, for example, the negative. The field was applied by passing a current through a wire going through the cylindrical thin film. A current of 100 milliamperes in the wire generates a field of about one oersted at the surface of the cylindrical thin film. When the field is removed the magnetization in the material is at its most negative value. The material is then exposed to a positive field by application of a 500 nanosecond pulse to the wire that is centrally located with the cylindrical thin film. The induction B resulting from this positive field was measured using a search coil and a device to measure the voltage induced in the coil. The material is then saturated again by a negative field to bring the magnetization to the most negative value again. Then another positive field of increased strength is applied by means of a 500 nanosecond pulse to the wire, the induction measured and the material saturated by a negative pulse. This procedure is repeated using increasingly higher positive fields until the "500 nanosecond S-curve" of the thin magnetic device is obtained.

The 25 nanosecond and D.C. "S-curves" were obtained according to the procedure described for the "500 nanosecond S-curve" except for the substitution of 25 nanosecond and $\frac{1}{60}$ second (or effectively D.C.) pulses, respectively, for the 500 nanosecond pulses. The three "S-curves" obtained are illustrated as FIGURE 3.

*Example 2*

The Example 1 was repeated precisely as described with the exception that a pretreatment of the chromium layer substrate was effected prior to electroplating. The chromium coated tube was dipped into a solution containing 0.1% by weight of hexachloroplatinic acid in water having a pH of approximately 2 for 4 periods of 5 seconds each at room temperature. Following the electroplating, a complete set of "S-curves" was run according to the procedure of Example 1 and is shown as FIGURE 4.

Figure 3:
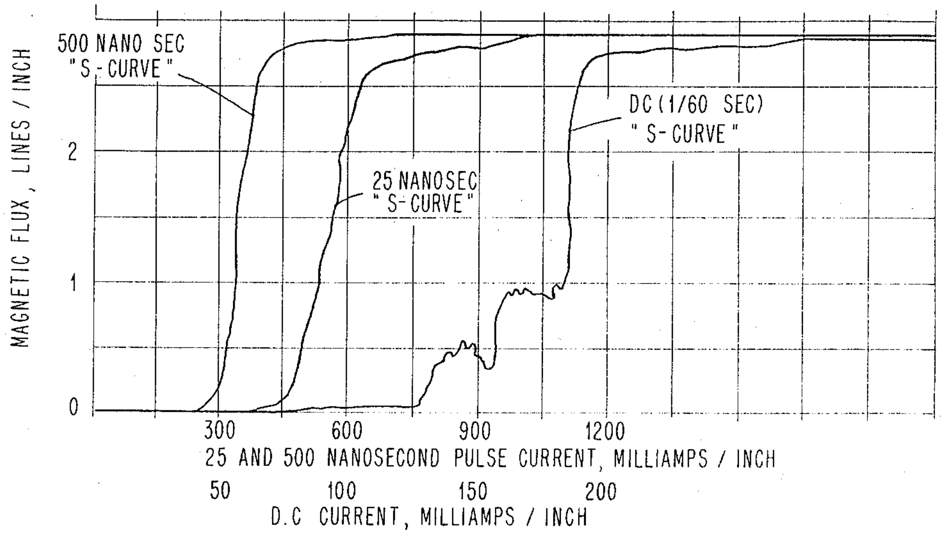
FIGURE 3 is a set of "S-curves" for a metallic bistable magnetic thin film made without utilizing the substrate pretreatment technique of the present invention.
Figure 4:
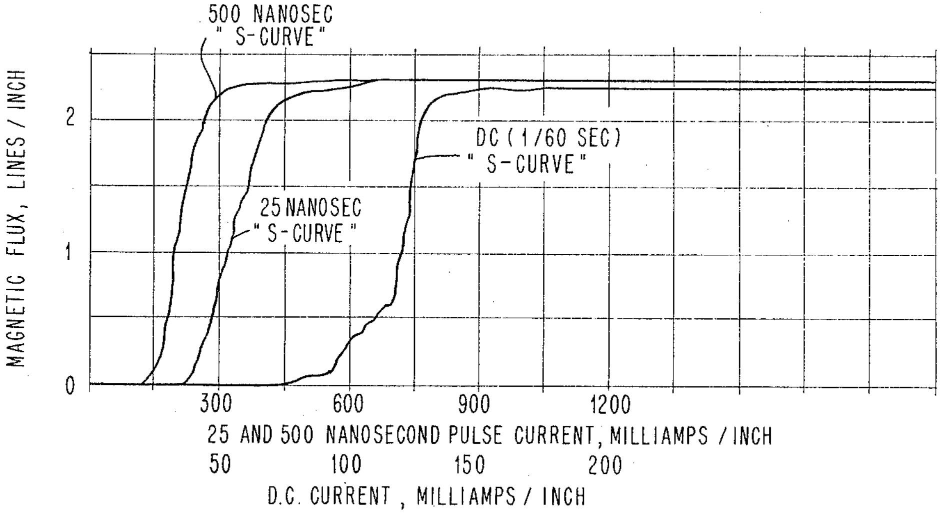
FIGURE 4 is a set of "S-curves" for a metal bistable magnetic thin film produced according to the technique of the present invention.

The resulting sets of curves given as FIGURES 3 and 4 can be visually compared. The curves of FIGURE 4 are markedly faster in reaching their maximum magnetic flux value than the curves of FIGURE 3. The coercivity $H_c$ of the FIGURE 3 thin film device is 1.6 oersteds in comparison to the FIGURE 4 thin film device coercivity of 1.2 oersteds. The switching period required for the magnetic thin films produced by the novel process of the invention is therefore seen to be substantially reduced from that of the prior art electroplating procedure of electroplating on a chromium substrate without pretreatment.

The improved results of the present invention is limited to the chromium underlayer and a platinum acid salt dipping solution under the conditions described. Both aluminum and copper have been tried as substitutes for the chromium underlayer while maintaining other steps of the procedure constant, however, there was no improvement over the prior art analogous to that obtained when using the chromium underlayer. Further, gold and palladium salt solutions were individually tried as the dipping solution without obtaining the improvement in magnetic switching over the prior art devices that results where hexachloroplatinic acid is used according to the novel method of the present invention.

While this invention has been particularly shown and described thereof, it will be understood by those skilled in the art that the foregoing and other changes in form and detail may be made therein without departing from the spirit and scope of the invention.

What is claimed is:

1. A method of fabricating bistable magnetic films having high speed magnetic switching characteristics comprising:
   treating a chromium substrate layer with a solution containing from 0.001 to 10 percent by weight of chloroplatinic acid for a time of less than about 30 minutes to produce a thin film of platinum over said substrate layer;
   and electroplating a magnetic nickel-iron alloy film having a thickness of thousands of Angstrom units over said chromium layer while applying a uniaxial orienting magnetic field at the surface of said chromium layer.

2. A method of electroplating magnetic nickel-iron alloy films having a low coercive force and high speed magnetic switching characteristics comprising:
   treating a chromium substrate layer with a solution containing from 0.001 to 10 percent by weight chloroplatinic acid for a time of less than about 30 minutes to produce a thin film of platinum over said layer;
   rinsing the said layer with water;
   introducing said layer into an electrolyte containing at least one salt of the elements of said magnetic alloy;
   making said layer the cathode of said cell;
   and passing a current between said cathode and said anode until the desired thickness in the order of thousands of Angstrom units of magnetic alloy electro-deposit has formed over said chromium substrate layer.

3. A method of fabricating bistable magnetic nickel-iron alloy films having high speed switching characteristics comprising:
   treating a chromium substrate layer with a solution containing from 0.001 to 10 percent by weight chloroplatinic acid for a time of less than about 30 minutes to produce a thin film of platinum over said layer;
   rinsing the said layer with water;
   introducing said layer into an electrolyte containing at least one salt of the elements of said magnetic alloy;
   making said layer the cathode of said cell;
   passing a current between said cathode and said anode until the desired thickness in the order of thousands of Angstrom units of magnetic alloy electrodeposit has formed over said chromium substrate layer;
   and applying a uniaxial orienting magnetic field during the formation of the said electrodeposit at the surface of said chromium layer.

4. A method of fabricating a closed flux bistable magnetic nickel-iron alloy film having a low coercive force and high speed magnetic switching characteristics comprising:
   treating a cylindrical, vacuum deposited chromium substrate layer of between about 100 to 1000 Angstrom units in thickness with a solution containing from 0.001 to 10 percent by weight chloroplatinic acid for a time of less than about 30 minutes to produce a thin film of platinum over said layer;
   rinsing the said layer with water;
   introducing said layer into an electrolyte containing at least one salt of the elements of said magnetic alloy;
   making said layer the cathode of said cell;
   passing a current between said cathode and said anode until the desired thickness in the order of thousands of Angstrom units of magnetic alloy electrodeposit has formed over said chromium substrate layer;
   and applying a circular orienting magnetic field during the formation of said electrodeposit around said cylindrical chromium layer.

5. A bistable magnetic device having improved high speed magnetic switching characteristics comprising:
   a nonconductive substrate;
   a conductive, vacuum evaporated coating of chromium of between about 100 to 1000 Angstrom units in thickness;
   a film of platinum over said chromium coating applied by dipping the coating in a chloroplatinic acid solution; and
   an electrodeposited bistable nickel-iron alloy layer in the order of thousands of Angstrom units over said film of platinum.

References Cited by the Examiner

UNITED STATES PATENTS

| | | | |
|---|---|---|---|
| 1,892,051 | 12/1932 | Gray et al. | 204—47 |
| 2,702,253 | 2/1955 | Bergstrom | 106—1 |
| 3,047,475 | 7/1962 | Hespenheide | 204—43 |
| 3,099,608 | 7/1963 | Radovsky et al. | 204—15 |
| 3,138,479 | 6/1964 | Foley | 117—47 |
| 3,141,837 | 7/1964 | Edelman | 204—43 |

OTHER REFERENCES

Bartelson et al., IBM Technical Disclosure Bulletin, Volume 3, No. 2, page 63 (July 1960).

Koretzky, IBM Techinical Disclosure Bulletin, Volume 5, No. 2, page 59 (July 1962).

JOHN H. MACK, *Primary Examiner.*

MURRAY TILLMAN, *Examiner.*

L. G. WISE, W. VAN SISE, *Assistant Examiners.*